(12) United States Patent
Hilliar et al.

(10) Patent No.: US 9,020,994 B1
(45) Date of Patent: Apr. 28, 2015

(54) CLIENT-BASED MIGRATING OF DATA FROM CONTENT-ADDRESSED STORAGE TO FILE-BASED STORAGE

(71) Applicant: EMC Corporation, Hopkinton, MA (US)

(72) Inventors: John A. Hilliar, Norwood, MA (US); John M. Hayden, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 301 days.

(21) Appl. No.: 13/627,434

(22) Filed: Sep. 26, 2012

(51) Int. Cl.
*G06F 17/30* (2006.01)
*G06F 12/12* (2006.01)

(52) U.S. Cl.
CPC ....................................... *G06F 12/12* (2013.01)

(58) Field of Classification Search
CPC .................... G06F 17/30997; H04L 63/0428; H04L 67/02; H04L 67/1095; H04L 67/1097; H04L 67/22; H04L 67/28; H04L 67/2852; H04L 69/08
See application file for complete search history.

(56) References Cited

U.S. PATENT DOCUMENTS

| 7,320,059 B1 * | 1/2008 | Armangau et al. ............ 711/162 |
| 2008/0181107 A1 | 7/2008 | Moorthi et al. |
| 2012/0317353 A1 | 12/2012 | Webman et al. |

* cited by examiner

*Primary Examiner* — Anteneh Girma
(74) *Attorney, Agent, or Firm* — BainwoodHuang

(57) ABSTRACT

A client computer migrates data objects from a first data store employing a flat namespace to a second data store employing a hierarchical directory-based file system. File storing includes (1) generating a data object (for user data file) and an object identifier which is returned to an application for use in retrieving the user data file; (2) mapping the object identifier to originate a subdirectory name; and (3) sending a write request to the file system to create the named subdirectory and store the data object therein. File retrieving includes (4) sending a read request including the object identifier to the first data store; (5) extracting a user data file from a received data object and returning it to the application; and (6) performing the steps of the file storing to store the data object at the second data store, completing the migration of the data object.

19 Claims, 7 Drawing Sheets

```
FILE STORING OPERATION:
        (1) GENERATE DATA OBJECT AND OBJECT IDENTIFIER, THE
DATA OBJECT CONTAINING USER DATA FILE BEING STORED AND THE
OBJECT IDENTIFIER UNIQUELY IDENTIFYING THE DATA OBJECT, AND
RETURN OBJECT IDENTIFIER TO APPLICATION PROGRAM
        (2) PERFORM MAPPING FUNCTION ON THE OBJECT IDENTIFIER
90      TO ORIGINATE SUBDIRECTORY NAME OF SUBDIRECTORY OF THE
HIERARCHICAL DIRECTORY STRUCTURE
        (3) SEND WRITE REQUEST TO THE FILE SYSTEM OF SECOND
REMOTE DATA STORE, THE WRITE REQUEST INCLUDING DATA
OBJECT, SUBDIRECTORY NAME, AND COMMAND TO CREATE A
SUBDIRECTORY HAVING THE SUBDIRECTORY NAME AND STORE THE
DATA OBJECT THEREIN
```

```
FILE RETRIEVING OPERATION:
        (4) SEND READ REQUEST INCLUDING THE OBJECT IDENTIFIER
TO THE FIRST REMOTE DATA STORE
        (5) UPON RECEIVING A DATA OBJECT, EXTRACT USER DATA
FILE AND RETURN IT TO THE APPLICATION
92      (6) PERFORM THE MAPPING FUNCTION ON THE OBJECT
IDENTIFIER TO ORIGINATE SUBDIRECTORY NAME OF SUBDIRECTORY
OF THE HIERARCHICAL DIRECTORY STRUCTURE
        (7) SEND WRITE REQUEST TO THE FILE SYSTEM OF SECOND
REMOTE DATA STORE, THE WRITE FILE REQUEST INCLUDING
RECEIVED DATA OBJECT, SUBDIRECTORY NAME, AND COMMAND TO
CREATE A SUBDIRECTORY HAVING THE SUBDIRECTORY NAME AND
STORE THE RECEIVED DATA OBJECT THEREIN
```

FILE STORING OPERATION:
    (1) GENERATE DATA OBJECT AND OBJECT IDENTIFIER, THE DATA OBJECT CONTAINING USER DATA FILE BEING STORED AND THE OBJECT IDENTIFIER UNIQUELY IDENTIFYING THE DATA OBJECT, AND RETURN OBJECT IDENTIFIER TO APPLICATION PROGRAM
    (2) PERFORM MAPPING FUNCTION ON THE OBJECT IDENTIFIER TO ORIGINATE SUBDIRECTORY NAME OF SUBDIRECTORY OF THE HIERARCHICAL DIRECTORY STRUCTURE
    (3) SEND WRITE REQUEST TO THE FILE SYSTEM OF SECOND REMOTE DATA STORE, THE WRITE REQUEST INCLUDING DATA OBJECT, SUBDIRECTORY NAME, AND COMMAND TO CREATE A SUBDIRECTORY HAVING THE SUBDIRECTORY NAME AND STORE THE DATA OBJECT THEREIN

90

FILE RETRIEVING OPERATION:
    (4) SEND READ REQUEST INCLUDING THE OBJECT IDENTIFIER TO THE FIRST REMOTE DATA STORE
    (5) UPON RECEIVING A DATA OBJECT, EXTRACT USER DATA FILE AND RETURN IT TO THE APPLICATION
    (6) PERFORM THE MAPPING FUNCTION ON THE OBJECT IDENTIFIER TO ORIGINATE SUBDIRECTORY NAME OF SUBDIRECTORY OF THE HIERARCHICAL DIRECTORY STRUCTURE
    (7) SEND WRITE REQUEST TO THE FILE SYSTEM OF SECOND REMOTE DATA STORE, THE WRITE FILE REQUEST INCLUDING RECEIVED DATA OBJECT, SUBDIRECTORY NAME, AND COMMAND TO CREATE A SUBDIRECTORY HAVING THE SUBDIRECTORY NAME AND STORE THE RECEIVED DATA OBJECT THEREIN

CLIENT-BASED MIGRATING OF DATA FROM CONTENT-ADDRESSED STORAGE TO FILE-BASED STORAGE

BACKGROUND

The invention is related to the field of data storage systems.

Data storage systems of a type referred to as "content addressed storage" or CAS are known. A CAS storage system may be used for bulk storage of a large number of files or similar data objects that may be relatively fixed, i.e., not subject to frequent (or any) change. One aspect of CAS storage is so-called content addressing, which refers to the association of each stored data object with a unique identifier that is generally calculated from the contents of the data object, for example by a hash function applied to the entire contents of a data file. A client of a CAS storage system can submit files for storage without any knowledge of how the storage system actually stores them. The CAS storage calculates the content address (CA) of each data object and stores it in association with the data object, as well as returning it to the client. When the client wishes to read the data object, it provides the CA to the CAS system, which then performs an associative lookup to retrieve the associated data object and return it to the client.

SUMMARY

While CAS storage systems provide very useful functionality for applications needing access to large sets of fixed data objects, there are important drawbacks to the deployment of CAS storage systems. In general, they have tended to be specialized hardware and software platforms optimized for CAS storage in order to provide the best performance. Because of the small demand for CAS systems in relation to more generally usable storage systems, such as so-called network attached storage or NAS for example, they do not benefit from certain economies of scale, most notably the economy of amortizing ongoing development costs across a large number of sold products. It may be difficult to incorporate new advances in storage technology into CAS systems because the cost is not justified by sufficiently increased revenue. Thus, uses of CAS systems obtain the specialized CAS functionality at the cost of keeping pace with other technology advances.

One theoretically possible way to implement a CAS data model using a file-oriented NAS system might be to simply store all the data objects in one single directory, and use the content address as the file name. Such an approach would have several problems, running up against practical limits of real NAS file systems that are designed based on certain assumptions that such an organization might violate.

The present disclosure is directed to client-based methods and apparatus for migrating data objects from a legacy CAS system to a file-based NAS system while maintaining backward compatibility with existing client applications. Migration is performed in parallel with normal operation, avoiding disruption to the operation of existing systems, and can be done in a manner providing for fail-back to the CAS system if necessary or desired. The disclosed technique enables the continued use of CAS-dependent applications with the ability to exploit contemporary and future technology developments that become incorporated into the general-purpose storage systems.

In particular, a method is disclosed of operating a client computer to migrate a set of data objects from a first remote data store employing a flat linear namespace to a second remote data store employing a file system having a hierarchical directory structure. For file storing operations for respective newly created user data files, a series of operations are performed, including (1) generating a data object and an object identifier, the data object containing the user data file being stored and the object identifier uniquely identifying the data object, and returning the object identifier to an application program for subsequent use in retrieving the user data file being stored; (2) performing a mapping function on the object identifier to originate a subdirectory name of a subdirectory of the hierarchical directory structure; and (3) sending a write request to the file system of the second remote data store, the write request including the data object, the subdirectory name, and a command to create a subdirectory having the subdirectory name and store the data object therein. The new user data files reside in the second remote data store and can be retrieved from it instead of from the first remote data store in subsequent read operations. If desired, the writes can be mirrored to the first remote data store to provide for "fail-back", i.e., the ability to resume operation exclusively using the first remote data store if it becomes necessary or desired.

File retrieving operations are performed for user data files contained in respective data objects stored in the first remote data store. Each file retrieving operation is initiated with a respective object identifier in the flat linear namespace uniquely identifying a data object containing a user data file being retrieved. Each file retrieving operation includes (4) sending a read request including the object identifier to the first remote data store; (5) upon receiving a data object from the first remote data store, extracting a user data file and returning the extracted user data file to the application; (6) performing the mapping function on the object identifier to originate a subdirectory name of a subdirectory of the hierarchical directory structure; and (7) sending a write request to the file system of the second remote data store, the write file request including the received data object, the subdirectory name, and a command to create a subdirectory having the subdirectory name and store the data object therein. The data object now resides in the second remote data store and can subsequently be retrieved therefrom.

The above technique may be augmented by a dedicated migration manager functioning as a background or demon process that forces reads (and hence migrations) of files that might not be read frequently or at all by the application in normal operation. This can speed up the completion of migration to the second remote data store.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 9 is a flow diagram showing detail of the operations of FIGS. 7-8.

DETAILED DESCRIPTION

Figure 1:
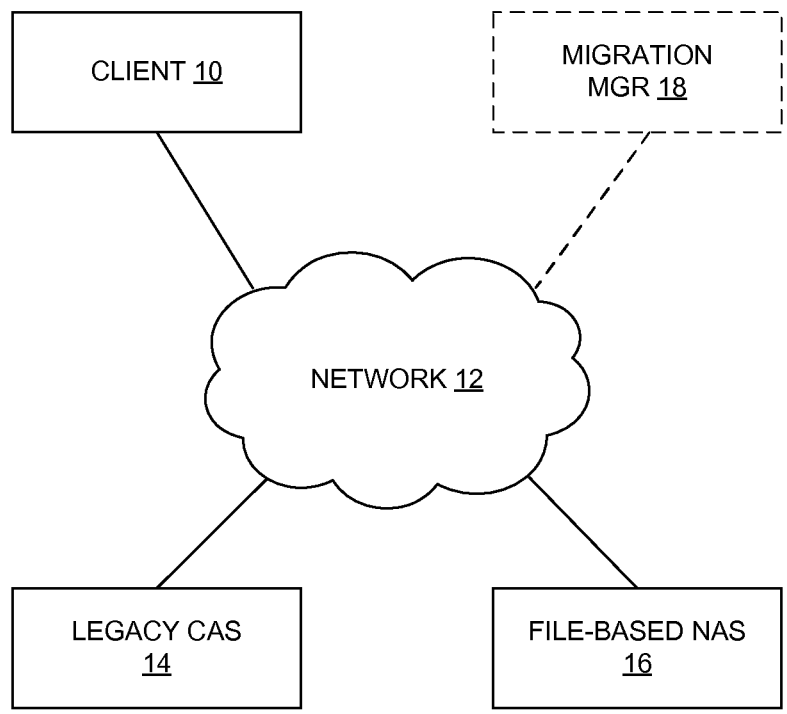
FIG. 1 is a block diagram of a computer system.

FIG. 1 shows a computing system including a client computer (client) 10, a network 12, and two different types of storage systems in the form of a legacy content-addressed storage (CAS) system 14 and a file-based network-attached storage (NAS) system. The system may optionally include another computer functioning as a migration node 18. In the simplified system of FIG. 1, only one of each system component is shown; it will be appreciated that in a real system there may be multiple instances of one or more of the components (e.g., multiple clients 10, NAS systems 16, etc.).

The client 10 is typically a server type of computer hosting one or more application programs providing services to users, who may be part of a single organization (such as a company that owns the server) or members of the public (subscribed or not) accessing the services over a public network. In particular, the client 10 executes one or more applications of a type that benefit from content-addressed storage such as provided by the CAS system 14. Specific examples are provided below.

The NAS system 16 is a storage system/device that includes one or more file systems and presents a file system interface to its external clients such as client 10. It may support well-known distributed file system protocols such as NFS or CIFS, for example. As generally known in the art, a file system typically employs a hierarchical "directory" paradigm for organizing the data objects (files) that it contains. The underlying storage media in the NAS system 16 (such as magnetic disk devices, FLASH memory, etc.) stores user and system data files as collections of fixed-size blocks of data, and also stores directory files including pointers to the user/system data files as well as to other directory files. This structure enables a user or system to organize data in the well-known top-down nested fashion. For example, a top level may have directories for different functions or departments of a company, while subdirectories may have divisions for different users, applications, geographies or date ranges, etc.

In general, NAS systems are well suited for data access patterns that may be relatively random and may be intensive in terms of update frequency. Applications have knowledge of the directory structure and can make pinpoint requests for reading/writing files, with an expectation of fast response time and acceptably high throughput. The hierarchical directory paradigm helps support this workload by its divide-and-conquer aspect—files can be located using only a small number of directory lookups. Techniques such as caching can be used to enhance random-access performance, accommodating the latency limitations of mechanical data access devices such as disk drives. One benefit of the use of a NAS system 16 is its ubiquity in modern systems. Because of wide deployment, NAS technology and products enjoy benefits such as low cost, excellent performance in a variety of applications, an ongoing advancement through the investments of NAS system manufacturers.

The CAS system 14 is a specialized storage system or device that is optimized to provide storage and access for large collections of relatively fixed data objects, such as libraries of documents, images, backed-up files, etc. These change infrequently or never, but they must be available for use by application programs (applications) hosted by the client 10. An example might be a library of fingerprint images used as part of a fingerprint-based identification system. An application on the client 10 may provide a service of comparing sample fingerprints with fingerprints stored in the CAS system 14 to identify an individual. This type of storage may be referred to as "write once read many" or "WORM" storage.

In the present case, an important aspect of the CAS system 14 is the use of a content-addressing scheme in contrast to the more conventional directory-based organization schemes employed by file systems such as provided by the NAS system 16. While more details are provided below, one aspect of content addressing is its use of a "flat" address space, also referred to as a "name space" herein. "Flat" refers to the lack of inherent hierarchy. For example, a content addressing scheme may utilize a hash function or similar high-entropy function that associates each file or data object with a corresponding n-digit number or address. Hash algorithms generating 256-bit hash values, for example, are currently in use. Each hash value can be interpreted as a single point in a linear array of $2^{256}$ points. Two data objects that may be very similar, such as different versions of the same spreadsheet for example, might hash to widely separated points in this space. Thus the hash value, or more generally content address, generally contains no organization information such as is inherent in a directory-based organization scheme.

The term "legacy" with respect to the CAS system 14 refers to its preexistence at a time of a migration of its data to the NAS system 16, as described in more detail herein. The CAS system 14 is used with a client-side software library that presents a CAS-specific application programming interface (API), termed a "legacy API" herein, to applications executing on the client 10. One feature of the presently disclosed system is a client-based data migration technique that transfers data from the CAS system 14 to the NAS system 16 without requiring modification of existing client applications using the legacy API, as also described in more detail below.

A migration manager node 18 is a specialized client system used primarily or exclusively for migrating data from the CAS system 14 to the NAS system 16. It is shown as optional because the primary migration method described herein is based on functionality in the client 10, which performs data migration as part of its normal processing of application data. The migration manager 18, if present, may be used in a more dedicated manner, programmed as a background or demon type of process to read data from the CAS 14 and write it to the NAS 16. The data may be accessed in a linear fashion, for example, starting at one end of the CAS address space and proceeding to the other end. It may be desirable to perform the transfers in batches or chunks of successive data objects. It will be appreciated that if a migration manager 18 is used, migration of a large data set can generally be achieved in substantially less time than if all migration is done by the client 10 itself.

Figure 2:
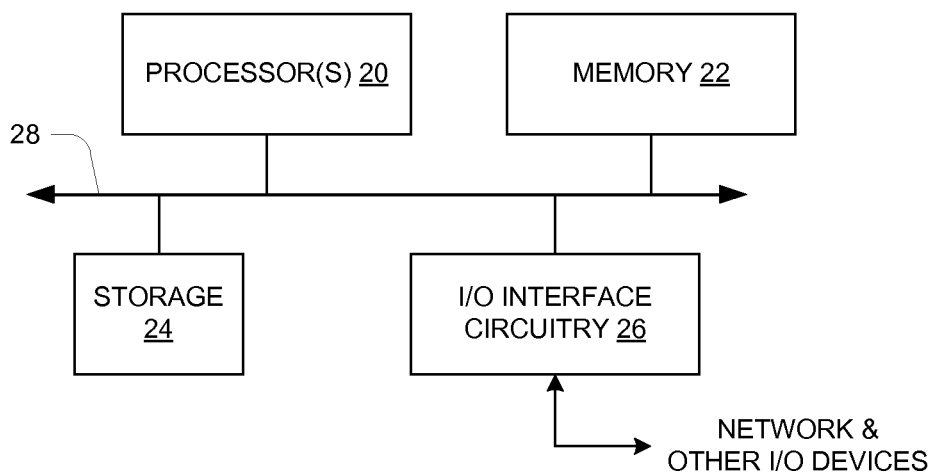
FIG. 2 is a block diagram of computer hardware.

FIG. 2 is a generalized depiction of a computer such as may be used to realize the client 10, CAS system 14, NAS system 16 and migration node 18. It includes one or more processors 20, memory 22, local storage 24 and input/output (I/O) interface circuitry 26 coupled together by one or more data buses 28. The I/O interface circuitry 26 couples the computer to one or more external networks (such as network 12), additional storage devices or systems, and other input/output devices as generally known in the art. System-level functionality of the computer is provided by the hardware executing computer program instructions (software), typically stored in the memory 22 and retrieved and executed by the processor(s) 20.

Any description herein of a software component performing a function is to be understood as a shorthand reference to operation of a computer or computerized device when executing the instructions of the software component. Also, the collection of components in FIG. 2 may be referred to as "processing circuitry", and when executing a given software component may be viewed as a function-specialized circuit, for example as a "mapping circuit" when executing a software component implementing a mapping function. It will be appreciated that storage systems such as CAS system 14 and NAS system 16 may have more specialized hardware organizations providing desired large storage capacity, high data transfer bandwidth, and other storage-specific features as generally known in the art. Any specialized hardware features for the disclosed operations are described below.

Figure 3:
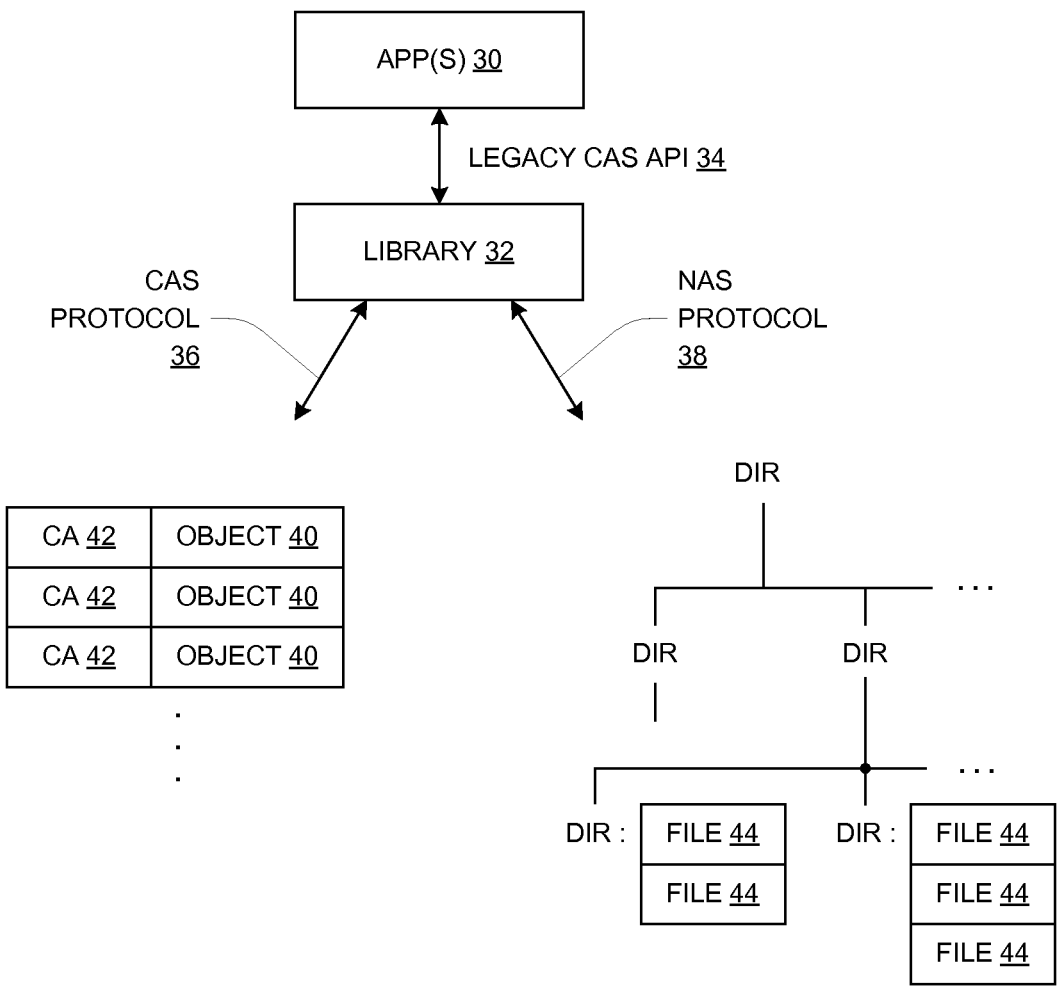
FIG. 3 is a schematic diagram of application access to two data stores of different structure.

FIG. 3 is a schematic depiction of elements of the client 10 in conjunction with organizations of data stored on the CAS system 14 and NAS system 16. The client 10 includes software in the form of an application program (also referred to as application or app) 30 and a library 32 of routines via which the application 30 accesses data stored on the CAS system 14 or NAS system 16. In one embodiment, the library 32 is a so-called "compile time" library that is linked into an executable application image that becomes installed on the client 10. In this case, reference to the application 30 is to be understood as that part of an application image separate from the linked-in components of library 32, i.e., the core software components executing higher-level operations that use the library 32 to carry out lower-level operations. For ease of description only one application 30 is described, but in general a client 10 may execute one or more applications that use CAS storage in the manner described herein.

At its interface to the application 30, the library 32 provides the above-discussed legacy API 34, as shown. Facing the network 12 and storage devices 14, 16 of FIG. 1, the library 32 supports both a CAS protocol 36 and a NAS protocol 38. The CAS protocol is based on a CAS model of the data storage as shown on the left, which is a collection of elements each having a data object 40 and an associated content address (CA) 42. The data objects 40 correspond to files as known to the application 30, as described more below. The NAS protocol 38 is based on a file-based model of the data storage as shown on the right, which is a hierarchical, directory-based file system such as discussed above. This file system is not necessarily visible to the application 30, and in fact it is assumed herein that the application 30 is a legacy application having the CAS model view of its stored data. The file system of the NAS system 16 is used as the underlying storage structure for an emulation of the CAS model which is provided by the library 32. The NAS protocol 38 preferably employs the preferred read/write access method of the NAS system 16, such as HTTP, NFS, CIFS, etc.

Referring to the CAS model again, each data object 40 typically includes a corresponding data file known to the application 30, and may include file-related metadata as well (e.g., file name, data of creation/modification, owner, etc.). Each content address 42 is an address value generally unique to the corresponding data object 40. When a file is initially transferred from the application 30 to the CAS system 14 for storage, it is provided without any specification of a location or address where it should be stored. The CAS system 14 performs a hash or similar function using the contents (and perhaps metadata) of the file to generate the file-specific CA 42, and this value is returned to the application 30 for use in subsequent read operations directed to the same file. During a read, the application 30 provides a CA, and this CA is compared with stored CAs 42. If a matching CA 42 is found, then the associated object 40 is returned to the application 30 in satisfaction of the read request.

Referring briefly to the file-based model, as known in the art each application access to a user file is accompanied by a path name or other specification of a directory in which the file resides. The file system uses the directory information in the request to locate a directory file for the directory where the file resides, then uses information in that directory file to locate the user file that is the target of the operation. It will be appreciated that without some kind of intervening translation, a directory-based file system does not lend itself to supporting the CAS model. This partly explains the existence of specialized CAS systems 14, which can employ data organizations specifically tailored for efficient storing and retrieving of content-addressed data objects.

As described in more detail below, the library 32 performs operations involving both the CAS system 14 and the NAS system 16 in response to operations of the application 30. When interacting with the CAS system 14, the library 32 uses the CAS protocol 36 and its underlying data model as described above. These operations have a somewhat pass-through nature, meaning that functions and data defined at the legacy API 34 have direct counterparts in the CAS protocol 36. This is not the case when the library 32 interacts with the NAS system 16, which has no understanding of the CAS protocol 36 or the CAS model of data organization as described above. Thus, in these operations the library 32 performs a translation between functions and data of the legacy CAS API 34 and the functions and data of the NAS protocol 38 and the file system provided by the NAS system 16.

Figure 4:
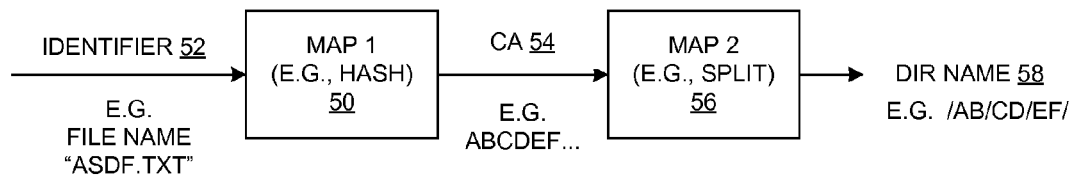
FIG. 4 is a schematic diagram of mapping a file identifier to a multi-level directory name.

FIG. 4 provides an illustration of this translation. A file as visible to an application 30 is associated with a specific directory and file name in the file system of the NAS system 16 by two mappings. In a first mapping 50, an identifier 52 of the file (such as the file name) is mapped to a corresponding content address (CA) 54. The first mapping 50 may be realized by one or more hashes or similar functions. In a second mapping 56, the content address 54 is mapped to a corresponding directory name 58 of a directory in the hierarchical file system of the NAS system 16 where the file is stored. In operation, it is also necessary to have a file name to be used for the file in the NAS system 16. It may be convenient as well as useful to use the same file name as is used in the file system of the application 30. It should be noted that the CA 54 is not the same as the above-discussed CA 42, and in fact in one embodiment described below a CA used in the same manner as CA 54 is derived from another CA that functions as a file identifier.

FIG. 4 includes a simple example. In this case the file name is used as the identifier 52, and it has the value "asdf.txt". This is the name of the file in the file system of the client 10. This file name is hashed to the CA 54 that is represented by the string ABCDEF . . . . The CA 54 may be of a fixed size (e.g., 64 bits) as dictated by a hash function used for the first mapping 50, although in some embodiments the CA 54 may not be of a fixed size. Sequential sets of bits are interpreted as characters usable to form directory names in the file system of the NAS system 16. A 64-bit CA 54 may be taken to represent an 8-character string, for example. The string constituting the CA 54 is then mapped to a path name of a directory, for example by grouping successive characters and treating each group or set as a directory name at a given hierarchical level. In the example, the string ABCDEF . . . is mapped to a three-level path name AB/CD/EF, identifying a third-level subdirectory EF under a top level directory AB and its subdirectory CD. This name is obtained by extracting the first six characters of the CA 54, then dividing the extracted characters into three successive 2-character groups. When the file name is appended, the fully qualified file name is /AB/CD/EF/asdf.txt.

The directory depth is not required to be a fixed depth. The depth can vary at run-time. For example, the library 30 might fill up the /AB/ directory with a certain number of files, then once it has reached the maximum number of desired files, it would fill subdirectories of /AB/with files, and so forth. This adaptive approach can improve search times for small numbers of files, as well as reduce the number of directories created for a small number of files. As the number of files grows, the library 30 searches down the tree to the maximum expected depth. The directory depth and max-files-per-directory may be configurable parameters of the library 30.

Figure 5:
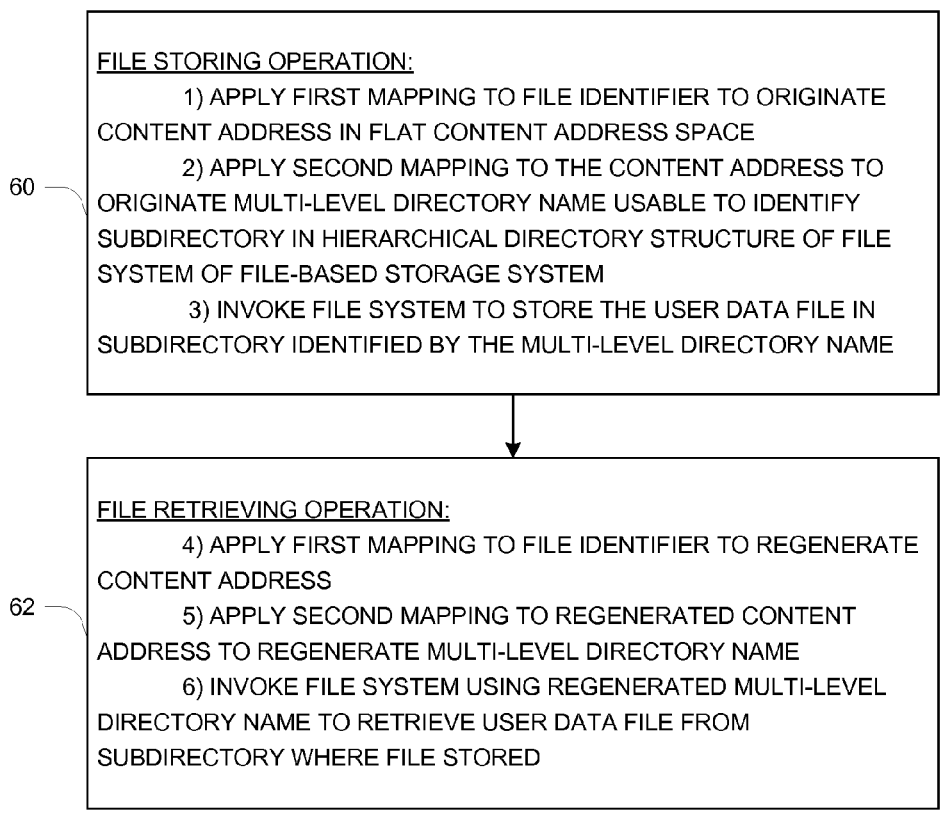
FIG. 5 is a flow diagram of operation of a library component using a hierarchical file system to store data having a flat-space organization.

FIG. 5 illustrates operation of the library 32 in connection with use of the NAS system 16 to store and retrieve data on behalf of the application 30 that is using the legacy CAS API 34. Step 60 shows actions taken as part of a file storing operation for a user data file initiated by the application 30. It includes the following:
1) Applying a first mapping to a file identifier for the file to originate a corresponding content address in a flat content address space. An example of a file identifier is a file name (as known to the application 30), but other types of identifiers may be used. The first mapping may be a hash function as described above, but other mappings may also be used.
2) Applying a second mapping to the content address to originate a corresponding multi-level directory name usable to identify a subdirectory in a hierarchical directory structure of a file system of the file-based storage system (e.g., NAS system 16). The second mapping may be a function as described above, i.e., dividing some or all of the content address into ordered groups of digits or characters and then interpreting each group as a directory name at a corresponding level of the directory hierarchy.
3) Invoking the file system to store the user data file in the subdirectory identified by the multi-level directory name.

Step 62 shows actions taken as part of a subsequent file retrieving operation for the user data file (as may be initiated by the application 30 using the same file identifier). It includes the following:
4) Applying the first mapping to the file identifier to regenerate the content address.
5) Applying the second mapping to the regenerated content address to regenerate the multi-level directory name.
6) Invoking the file system using the regenerated multi-level directory name to retrieve the user data file from the subdirectory identified by the directory name.

Figure 6:
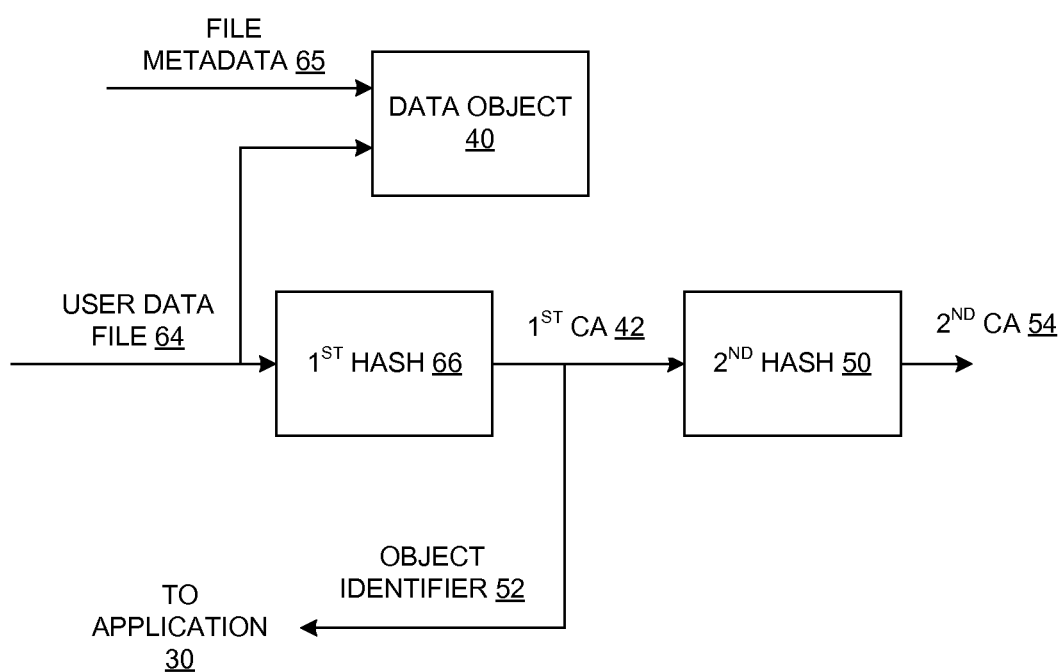
FIG. 6 is a schematic diagram of mapping a user data file to a multi-level directory name.

FIG. 6 illustrates a variant of the scheme of FIG. 4 according to a more specific embodiment for emulating CAS storage using a NAS system 16. A user data file 64 along with associated metadata 65 (e.g., information from file system of client 10 such as file name, owner name, data of creation, etc.) are packaged together into a data object 40 that will be the container for storing the user data file 64. Additionally, a first hash function 66 is calculated from the contents of the user data file 64. As shown, the result constitutes the content address (CA, referred to as $1^{st}$ CA) 42 of FIG. 3. The $1^{st}$ CA 42 is returned to the application 30 as the identifier 52 of FIG. 4. During a read, the application 30 presents the object identifier 52, which is analogous to requesting a file by its file name. The operations up to this point are the same as those normally performed in the CAS system 14 in its interaction with an application 30. Thus, one aspect of the present disclosure is locating these functions in the library 32 at the client 10, to facilitate migration as described in more detail below.

Also shown in FIG. 6 is a second hash function 50 applied to the first CA 42 to originate the $2^{nd}$ CA 54 of FIG. 4. From this point, the scheme is as discussed above, i.e., the $2^{nd}$ CA is mapped ($2^{nd}$ map 56 of FIG. 4) to a directory name 58 which is used to identify a subdirectory in the file system of the NAS system 16 where the data object 40 is to be stored and retrieved from. It will be appreciated that when the application 30 first writes the user data file 64, all the operations depicted in FIG. 6 are performed. During subsequent reads of the user data file 64, the application 30 provides the object identifier 52, and operation is as described above with respect to FIGS. 4 and 5.

Figure 7:
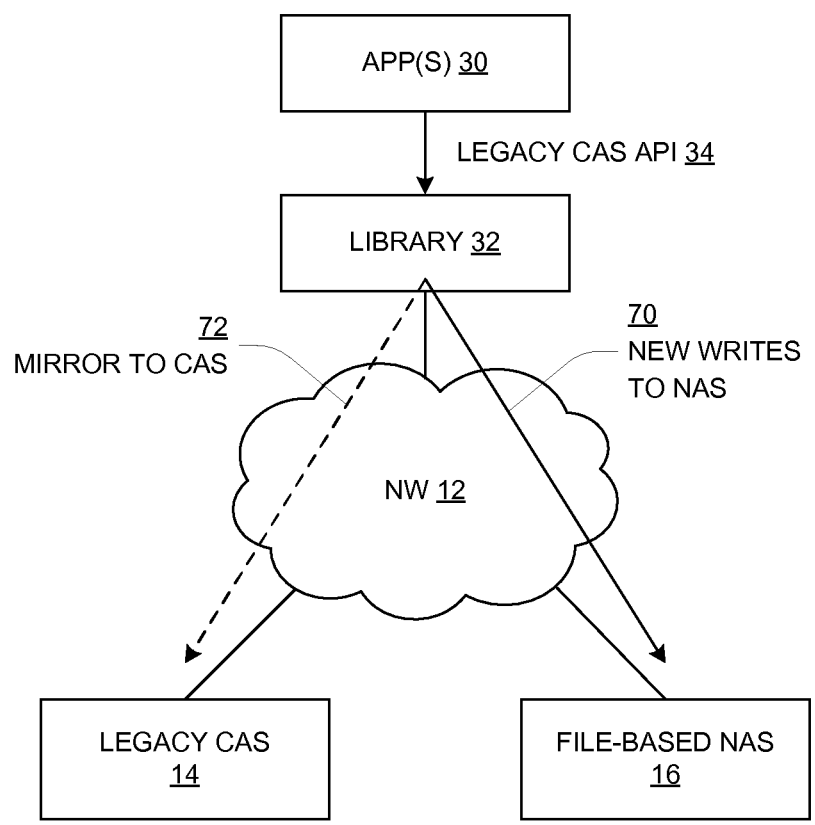
FIGS. 7-8 are schematic diagrams of operation of a library component in connection with migration of data from a flat-space organization to a hierarchical directory organization.
Figure 8:
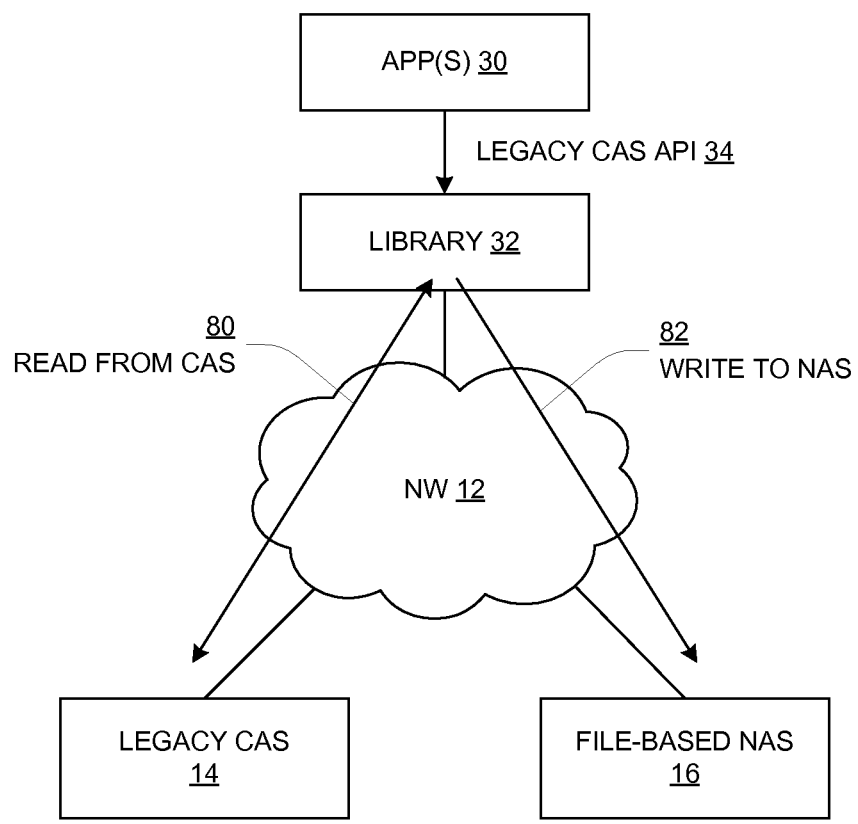

FIGS. 7-9 are used to describe migration of a CAS data store from the legacy CAS system 14 to the NAS system 16. It is assumed that at the time of initial operation of the NAS system 16 the legacy CAS system 14 already contains data objects for user data files previously generated by the application 30. These existing data objects have associated object identifiers taken from the flat, linear name space used by the CAS model (see FIG. 2 and CAs 42). Migration involves two aspects. First, newly generated user data files are stored on the NAS system 16 as the new primary store (although they may also be mirrored to the legacy CAS 14 for certain purposes, as explained below). Second, all user data files already stored on the legacy CAS system 14 are transferred to the NAS system 16. This transfer preferably occurs while normal operation of the application 30 continues. While migration-related data traffic may cause some minor performance degradation, this may be offset by superior performance of the NAS system for reads on previously migrated data as well as acknowledgement of new writes.

FIG. 7 illustrates a manner by which the library 32 handles file storing operations (writes) for new user data files received from the application 30 according to the legacy CAS API 34. As indicated, new user data files are packaged into corresponding writes 70 to the NAS 16. The writes 70 are generated using a form of the above-described mapping process, as described more below. In connection with each write 70, the library 32 generates an object identifier (e.g., CA 42) that is returned to the application 30 for later use in retrieving a newly written data object 40 that includes the user data file being stored.

The application 30 never knows where the data object is actually stored. The object identifier may have no state information about the location of the data object. The library 32 may be configured for reading and/or writing to CAS system 14 and/or NAS 16 according to an explicit scheme. In general, configuration options could be represented conceptually by a table as follows:

| Library Configuration | CAS System | NAS System |
| --- | --- | --- |
| Reading Data | Enabled/Disabled | Enabled/Disabled |
| Writing Data | Enabled/Disabled | Enabled/Disabled |

The configuration options may be used in the following manner:
1. Writing New Data:
   If writing data is enabled for both CAS and NAS, then the library 32 is configured for mirroring of data between the CAS system 14 and the NAS system 16.

If writing data is only enabled on the NAS system 16, then the user feels confident about the overall solution and is comfortable having newer data available only on the NAS system 16.

If writing data is only enabled for the CAS system 14, then the user probably went from a mirrored configuration to one where the user wants to revert to a CAS-only solution.

2. Reading Data:

If reading data is enabled for both CAS and NAS, then the library 32 can apply one of several techniques depending on desired behavior and depending on the relative performance of the NAS system 16 versus the CAS system 14. The library 32 can attempt to read data from one of the systems 14 or 16, and if found then return it to the user, and if not found then try the other system. If the data is found on the second system, then it is returned to the user, and if not found on the second system then a failure-to-locate message may be returned. There may be a configuration of which system to check first, which could be determined based on relative speed, percentage completion of the migration job (affects probability of finding data on one system versus the other), load difference on the storage systems, or other specific criteria. Alternatively, the library 32 could query both storage systems 14, 16 at the same time, leveraging the parallel execution for faster response time.

If reading data is enabled for only the CAS system 14, then the user probably went from a mirrored configuration to one where the user wants to revert to a CAS-only solution.

If reading data is enabled for only the NAS system 16, then the user is probably preparing to switch to a NAS-only solution.

The object identifier (e.g., CA) returned to the application 30 is opaque to the application 30, meaning the application 30 does not interpret it. The library 32, as an intermediate layer between the application 30 and the storage systems 14, 16, does understand the format of the object identifier. The library 32 may place a hint in the object identifier of newly written data which can help the library 32 determine the location of the data object in a subsequent access. In one embodiment such a hint may always be included, whereas in other embodiments any use of such a hint may be used in some conditional manner depending on any of a variety of criteria known to the library 32. Such alternatives also apply to any other state and information that might be stored in the object identifier for later use in an interaction with the application 30.

Referring again to FIG. 7, as indicated at 72, the writes 70 may be mirrored or duplicated to the CAS system 14 so that its contents remain current. This might be done to enable the migration operation to be aborted if necessary or desired without losing any data newly stored during the migration operation. The use of mirroring to the CAS 14 can also provide increased confidence in case of concerns about the robustness of the migration operation—migration can proceed knowing that it will be possible to revert to operation with the CAS 14 if any problems develop. This possibility exists until the mirroring is stopped, which may occur when there is sufficient confidence in the integrity and operation of the NAS 16 to commit to NAS-only operation going forward.

FIG. 8 illustrates a manner by which the library 32 handles file retrieving operations (reads) for user data files that are requested by, and returned to, the application 30 according to the legacy CAS API 34. In particular, the operation depicted assumes that the target data objects are stored on the CAS system 14, such as data objects that were generated and stored prior to the beginning of the migration operation. For objects generated and stored after the beginning of the migration operation, they may be obtained from the NAS system 16 as the new primary store, or perhaps from the CAS system 14 if mirroring has been used. As indicated above, there may be a variety of ways by which the library 32 locates target data objects.

As shown at 80, the library 32 performs a retrieve operation (read) 80 from the CAS system 14. The request from the application 30 includes an object identifier previously returned to the application 30 when the file was initially given to the library 32 for storing. The read 30 includes this object identifier. The CAS system 14 uses an associative lookup to obtain the corresponding data object (e.g., data object 40) and returns it to the library 32, which extracts the user data file (e.g., user data file 64) from the data object and returns it to the application 30 in satisfaction of the request. Additionally, the library 32 generates a write 82 to store the data object in the NAS 16, achieving the migration of that particular data object from the CAS 14 to the NAS 16. Subsequent reads for this data object are satisfied from the NAS 16 rather than from the CAS 14. If the system is not keeping the CAS system 14 up to date (e.g., by using mirroring), then at this point the data object may be deleted from the CAS 14.

FIG. 9 is a flowchart describing in more detail the operations of the client computer 10, specifically the library 32, outlined with respect to FIGS. 7-8. Specifically, FIG. 9 describes a method of operating the client 10 to migrate a set of data objects (e.g., objects 40) from a first remote data store employing a flat linear namespace (e.g., CAS system 14) to a second remote data store employing a file system having a hierarchical directory structure (e.g., NAS system 16).

Step 90 is performed for each of a plurality of file storing operations for respective user data files. It includes generating a data object and an object identifier, where the data object contains the user data file being stored and the object identifier uniquely identifies the data object. The object identifier is returned to an application program (e.g., application 30) for subsequent use in retrieving the user data file being stored. Secondly, a mapping function is performed on the object identifier to originate a subdirectory name of a subdirectory of the hierarchical directory structure of the second remote data store. Thirdly, write request is sent to the file system of the second remote data store. The write request includes the data object, the subdirectory name, and a command to create a subdirectory having the subdirectory name and store the data object in the subdirectory. As mentioned above, this write may also be mirrored to the first remote data store for the above-discussed purposes.

Step 92 is performed for each of a plurality of file retrieving operations directed to user data files contained in respective data objects stored in the first remote data store, wherein each file retrieving operation is initiated with a respective object identifier in the flat linear namespace uniquely identifying a data object containing a user data file being retrieved. This step includes (4) sending a read request including the object identifier to the first remote data store, (5) upon receiving a data object from the first remote data store in satisfaction of the read request, extracting a user data file and returning the extracted user data file to the application, (6) performing the mapping function on the object identifier to originate a subdirectory name of a subdirectory of the hierarchical directory structure, and (7) sending a write request to the file system of the second remote data store, the write file request including the received data object, the subdirectory name, and a command to create a subdirectory having the subdirectory name and store the data object in the subdirectory. Parts (6) and (7) correspond to the writes 82 of FIG. 8.

As mentioned above, the migration performed by the writes 82 and operations 92 can be augmented by additional operations generated by a dedicated migration manager 18, which may be desirable if it is desired to complete migration quickly and/or when the application 30 is not guaranteed to read every data object stored on the legacy CAS system 14.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a client computer to migrate a set of data objects from a first remote data store employing a flat linear namespace to a second remote data store employing a file system having a hierarchical directory structure, comprising:

for each of a plurality of file storing operations for respective user data files:
  (1) generating a data object and an object identifier, the data object containing the user data file being stored and the object identifier uniquely identifying the data object, and returning the object identifier to an application program for subsequent use in retrieving the user data file being stored;
  (2) performing a mapping function on the object identifier to originate a subdirectory name of a subdirectory of the hierarchical directory structure; and
  (3) sending a write request to the file system of the second remote data store, the write request including the data object, the subdirectory name, and a command to create a subdirectory having the subdirectory name and store the data object therein; and for each of a plurality of file retrieving operations directed to user data files contained in respective data objects stored in the first remote data store, each file retrieving operation initiated with a respective object identifier in the flat linear namespace uniquely identifying a data object containing a user data file being retrieved:
  (4) sending a read request including the object identifier to the first remote data store;
  (5) upon receiving a data object from the first remote data store, extracting a user data file and returning the extracted user data file to the application;
  (6) performing the mapping function on the object identifier to originate a subdirectory name of a subdirectory of the hierarchical directory structure; and
  (7) sending a write request to the file system of the second remote data store, the write file request including the received data object, the subdirectory name, and a command to create a subdirectory having the subdirectory name and store the data object therein, and further including, for each of the file storing operations:
  sending a mirroring write request to the first remote data store, the mirroring write request including the data object, the object identifier, and a command to store the data object in association with the object identifier in the second remote data store.

2. A method according to claim 1, wherein the data object of each mirroring write request is retrieved from the second remote data store as the primary data store for the data object in the event of completion of migration and subsequent exclusive use of the second remote data store, and the data object of each mirroring write request is retrieved from the first remote data store as the primary data store for the data object in the event of reverting to exclusive use of the first remote data store.

3. A method according to claim 1, wherein data objects including the data objects subject to the mirroring write requests are requested from both the first and second remote data stores in parallel, and the data object of a first response to parallel requests is returned to the application.

4. A method according to claim 1, further including acknowledging write completion to the application for each file storing operation at a time earlier than an earliest time that write completion could be acknowledged based on the mirroring write requests.

5. A method according to claim 1, wherein a separate migration manager computer performs a background migration process of transferring data objects from the first remote data store to the second remote data store, and wherein the file retrieving operations are directed to user data files for which the corresponding data objects have not been transferred to the second remote data store by the background migration process.

6. A method according to claim 1, wherein the client computer includes an application and a library, the application initiating the file storing operations and file retrieving operation using a legacy application programming interface (API) supporting only the flat linear namespace, the library interfacing with the application using the legacy API and communicating with the second remote data store using a second communications protocol supporting the hierarchical directory structure and not supporting the flat linear namespace.

7. A method according to claim 6, wherein the second communications protocol includes read and write access methods that are preferred read and write access methods of the second remote data store.

8. A method according to claim 7, wherein the preferred read and write access methods are selected from hypertext-based access methods and distributed-file-system-based access methods.

9. A method according to claim 1, wherein generating the object identifier includes applying a first hash function to a user data file being stored, a result of the hash function serving as part or all of the object identifier, and wherein the mapping function performed on the object identifier is a second hash function distinct from the first hash function.

10. A client computer, comprising:
one or more processors;
memory;
input/output interface circuitry including an interface to a network via which a first remote data store and a second remote data store can be communicated with, the first remote data store employing a flat linear namespace and the second remote data store employing a file system having a hierarchical directory structure; and
interconnection circuitry coupling the processors, memory and input/output interface circuitry together for data transfer therebetween,
the memory storing computer program instructions executable by the processors to cause the client computer to perform a method of migrating a set of data objects from the first remote data store to the second remote data store, the method including, for each of a plurality of file storing operations for respective user data files:
  (1) generating a data object and an object identifier, the data object containing the user data file being stored and the object identifier uniquely identifying the data object, and returning the object identifier to an application program for subsequent use in retrieving the user data file being stored;

(2) performing a mapping function on the object identifier to originate a subdirectory name of a subdirectory of the hierarchical directory structure; and (3) sending a write request to the file system of the second remote data store, the write request including the data object, the subdirectory name, and a command to create a subdirectory having the subdirectory name and store the data object therein; and the method further including, for each of a plurality of file retrieving operations directed to user data files contained in respective data objects stored in the first remote data store, each file retrieving operation initiated with a respective object identifier in the flat linear namespace uniquely identifying a data object containing a user data file being retrieved:

(4) sending a read request including the object identifier to the first remote data store;

(5) upon receiving a data object from the first remote data store, extracting a user data file and returning the extracted user data file to the application;

(6) performing the mapping function on the object identifier to originate a subdirectory name of a subdirectory of the hierarchical directory structure; and (7) sending a write request to the file system of the second remote data store, the write file request including the received data object, the subdirectory name, and a command to create a subdirectory having the subdirectory name and store the data object therein, and wherein the method performed by cause of the computer program instructions further includes, for each of the file storing operations:

sending a mirroring write request to the first remote data store, the mirroring write request including the data object, the object identifier, and a command to store the data object in association with the object identifier in the second remote data store.

11. A client computer according to claim 10, wherein the data object of each mirroring write request is retrieved from the second remote data store as the primary data store for the data object in the event of completion of migration and subsequent exclusive use of the second remote data store, and the data object of each mirroring write request is retrieved from the first remote data store as the primary data store for the data object in the event of reverting to exclusive use of the first remote data store.

12. A client computer according to claim 10, wherein data objects including the data objects subject to the mirroring write requests are requested from both the first and second remote data stores in parallel, and the data object of a first response to parallel requests is returned to the application.

13. A client computer according to claim 10, wherein the method performed by cause of the computer program instructions further includes acknowledging write completion to the application for each file storing operation at a time earlier than an earliest time that write completion could be acknowledged based on the mirroring write requests.

14. A non-transitory computer readable medium having computer program instructions recorded thereon, the computer program instructions being executable by a client computer to cause the client computer to perform a method of migrating a set of data objects from a first remote data store to a second remote data store, the first remote data store employing a flat linear namespace and the second remote data store employing a file system having a hierarchical directory structure, the method including, for each of a plurality of file storing operations for respective user data files:

(1) generating a data object and an object identifier, the data object containing the user data file being stored and the object identifier uniquely identifying the data object, and returning the object identifier to an application program for subsequent use in retrieving the user data file being stored;

(2) performing a mapping function on the object identifier to originate a subdirectory name of a subdirectory of the hierarchical directory structure; and (3) sending a write request to the file system of the second remote data store, the write request including the data object, the subdirectory name, and a command to create a subdirectory having the subdirectory name and store the data object therein; and the method further including, for each of a plurality of file retrieving operations directed to user data files contained in respective data objects stored in the first remote data store, each file retrieving operation initiated with a respective object identifier in the flat linear namespace uniquely identifying a data object containing a user data file being retrieved:

(4) sending a read request including the object identifier to the first remote data store;

(5) upon receiving a data object from the first remote data store, extracting a user data file and returning the extracted user data file to the application;

(6) performing the mapping function on the object identifier to originate a subdirectory name of a subdirectory of the hierarchical directory structure; and (7) sending a write request to the file system of the second remote data store, the write file request including the received data object, the subdirectory name, and a command to create a subdirectory having the subdirectory name and store the data object therein, and wherein the method performed by cause of the computer program instructions further includes, for each of the file storing operations:

sending a mirroring write request to the first remote data store, the mirroring write request including the data object, the object identifier, and a command to store the data object in association with the object identifier in the second remote data store.

15. A non-transitory computer readable medium according to claim 14, wherein the data object of each mirroring write request is retrieved from the second remote data store as the primary data store for the data object in the event of completion of migration and subsequent exclusive use of the second remote data store, and the data object of each mirroring write request is retrieved from the first remote data store as the primary data store for the data object in the event of reverting to exclusive use of the first remote data store.

16. A non-transitory computer readable medium according to claim 14, wherein data objects including the data objects subject to the mirroring write requests are requested from both the first and second remote data stores in parallel, and the data object of a first response to parallel requests is returned to the application.

17. A non-transitory computer readable medium according to claim 14, wherein the method performed by cause of the computer program instructions further includes acknowledging write completion to the application for each file storing operation at a time earlier than an earliest time that write completion could be acknowledged based on the mirroring write requests.

18. A client computer according to claim 10, wherein a separate migration manager computer performs a background migration process of transferring data objects from the first remote data store to the second remote data store, and wherein the file retrieving operations are directed to user data files for which the corresponding data objects have not been transferred to the second remote data store by the background migration process.

19. A non-transitory computer readable medium according to claim 14, wherein a separate migration manager computer performs a background migration process of transferring data objects from the first remote data store to the second remote data store, and wherein the file retrieving operations are directed to user data files for which the corresponding data objects have not been transferred to the second remote data store by the background migration process.

* * * * *